United States Patent
Kamiyama et al.

(10) Patent No.: US 8,240,339 B2
(45) Date of Patent: Aug. 14, 2012

(54) EXISTING PIPE REHABILITATION METHOD

(75) Inventors: Takao Kamiyama, Hiratsuka (JP); Koji Kaneta, Hiratsuka (JP); Kenji Fujii, Hiratsuka (JP); Katsuyori Miura, Hiratsuka (JP)

(73) Assignee: Shonan Gosei-Jushi Seisakusho K.K. (JP)

( * ) Notice: Subject to any disclaimer, the term of this patent is extended or adjusted under 35 U.S.C. 154(b) by 388 days.

(21) Appl. No.: 12/655,094

(22) Filed: Dec. 23, 2009

(65) Prior Publication Data

US 2010/0307624 A1 Dec. 9, 2010

(30) Foreign Application Priority Data

Jun. 3, 2009 (JP) ................................. 2009-133588
Oct. 7, 2009 (JP) ................................. 2009-233178

(51) Int. Cl.
*F16L 55/162* (2006.01)
(52) U.S. Cl. ...... 138/98; 138/97; 405/150.1; 405/184.2; 405/151
(58) Field of Classification Search .................... 138/97, 138/98; 405/150.1, 151, 184.2
See application file for complete search history.

(56) References Cited

U.S. PATENT DOCUMENTS

| 2,096,850 | A | * | 10/1937 | Forsberg | 405/150.1 |
| 2,098,915 | A | * | 11/1937 | Foukal | 405/151 |
| 3,695,044 | A | * | 10/1972 | Hoshino et al. | 405/152 |
| 4,730,427 | A | * | 3/1988 | Tomsin | 52/245 |
| 4,997,602 | A | * | 3/1991 | Trimble | 264/32 |
| 6,796,334 | B2 | * | 9/2004 | Ishikawa et al. | 138/98 |
| 2004/0108009 | A1 | * | 6/2004 | Kamiyama et al. | 138/97 |
| 2005/0236058 | A1 | * | 10/2005 | Kamiyama et al. | 138/98 |

* cited by examiner

*Primary Examiner* — James Hook
(74) *Attorney, Agent, or Firm* — Adams & Wilks

(57) ABSTRACT

Segments are linked in the circumferential and pipe length directions to assemble a rehabilitating pipe inside an existing pipe in order to rehabilitate the existing pipe. A plurality of nuts are secured to the segments along the circumferential direction thereof. A fastening member having a screw part is provided which is screwed into the nut to fasten a first segment to a second segment to which the nut is secured, thereby linking the first and second segments in the pipe length direction thereof. The position of the nut in the first segment is offset as viewed in the circumferential direction from the nut position of the second segment. The arrangement of the fastening members and the nuts is staggered as viewed in its entirety. This allows the connection strength of the segments in the pipe length direction to be made uniform.

8 Claims, 15 Drawing Sheets

EXISTING PIPE REHABILITATION METHOD

BACKGROUND OF THE INVENTION

1. Field of the Invention

The present invention relates to an existing pipe rehabilitation method for rehabilitating existing pipes by linking a plurality of segments in the circumferential direction and pipe length direction to assemble a rehabilitating pipe inside the existing pipe.

2. Description of the Related Art

There are pipe rehabilitation methods known in the art in which a plurality of segments is linked in the circumferential direction and pipe length direction to assemble a rehabilitating pipe when sewerage pipes, waterworks pipes, agricultural water pipes, and other existing pipes have aged. A filler is used to fill the space between the rehabilitating pipe and existing pipe so as to integrate both the pipes together and construct a composite pipe (JP-A-2003-286742 and JP-A-2005-299711).

The rehabilitating pipe segment is an assembly unit for a rehabilitating pipe and comprises an internal surface plate, side plates, and end plates, these plates being integrally molded from a transparent or nontransparent plastic material in the form of a block. Reinforcing plates and ribs are preferably provided to increase the strength of the segment.

To link the segments in the pipe length direction, liking members are used which extend along the pipe length direction over both the side plates. The linking members are fixed to the segments and mutually linked to couple the segments together in the pipe length direction (JP-A-2005-299711).

In a method for linking segments as disclosed in JP-A-2005-299711, the linking members are mutually linked in the pipe length direction to produce a single long connected rod-shaped member. However, the segments cannot be coupled in the pipe length direction with sufficient strength at locations where no linking member exists, thus causing a problem that the coupling strength is different in the circumferential direction.

Using many segments as viewed in the circumferential direction of the segment enables the coupling strength to be uniform and to be increased. However, this disadvantageously increases man-hours and costs.

SUMMARY OF THE INVENTION

It is therefore an object of the invention to provide an existing pipe rehabilitation method that is capable of linking segments in the pipe length direction so as to make the strength of the rehabilitating pipe uniform.

The present invention is characterized by an existing pipe rehabilitation method for rehabilitating an existing pipe by linking segments in the circumferential and pipe length directions to assemble a rehabilitating pipe inside the existing pipe. The method comprises securing a plurality of nuts to the segments along the circumferential direction thereof; preparing a fastening member that can be screwed into the nut; and screwing the fastening member into the nut to fasten a first segment to a second segment to which the nut is secured, thereby linking the first and second segments in the pipe length direction thereof. Each of the segments is linked so that the nut position in the first segment is offset as viewed in the circumferential direction from the nut position of the second segment.

In such a configuration, each segment is linked so that the nut position in the first segment is offset as viewed in the circumferential direction from the nut position of the second segment that is adjacent to the first segment. Therefore, the arrangement of the fastening members and the nuts is made staggered as viewed in its entirety. This allows the connection strength of the segments in the pipe length direction to be made uniform.

Further features of the invention, its nature and various advantages will be more apparent from the accompanying drawings and following detailed description of the invention.

BRIEF DESCRIPTION OF THE DRAWINGS

FIG. 11b is a cross-sectional view showing a state in which the separating pin has been pushed further in;

DESCRIPTION OF THE PREFERRED EMBODIMENTS

Embodiments of the present invention are described in detail hereinafter with reference to the attached drawings. In the present invention, segments for rehabilitating an existing pipe such as a sewerage pipe, a waterworks pipe, an agricultural water pipe, and the like are linked inside the existing pipe as a rehabilitating pipe in order to rehabilitate the existing pipe.

Figure 1:
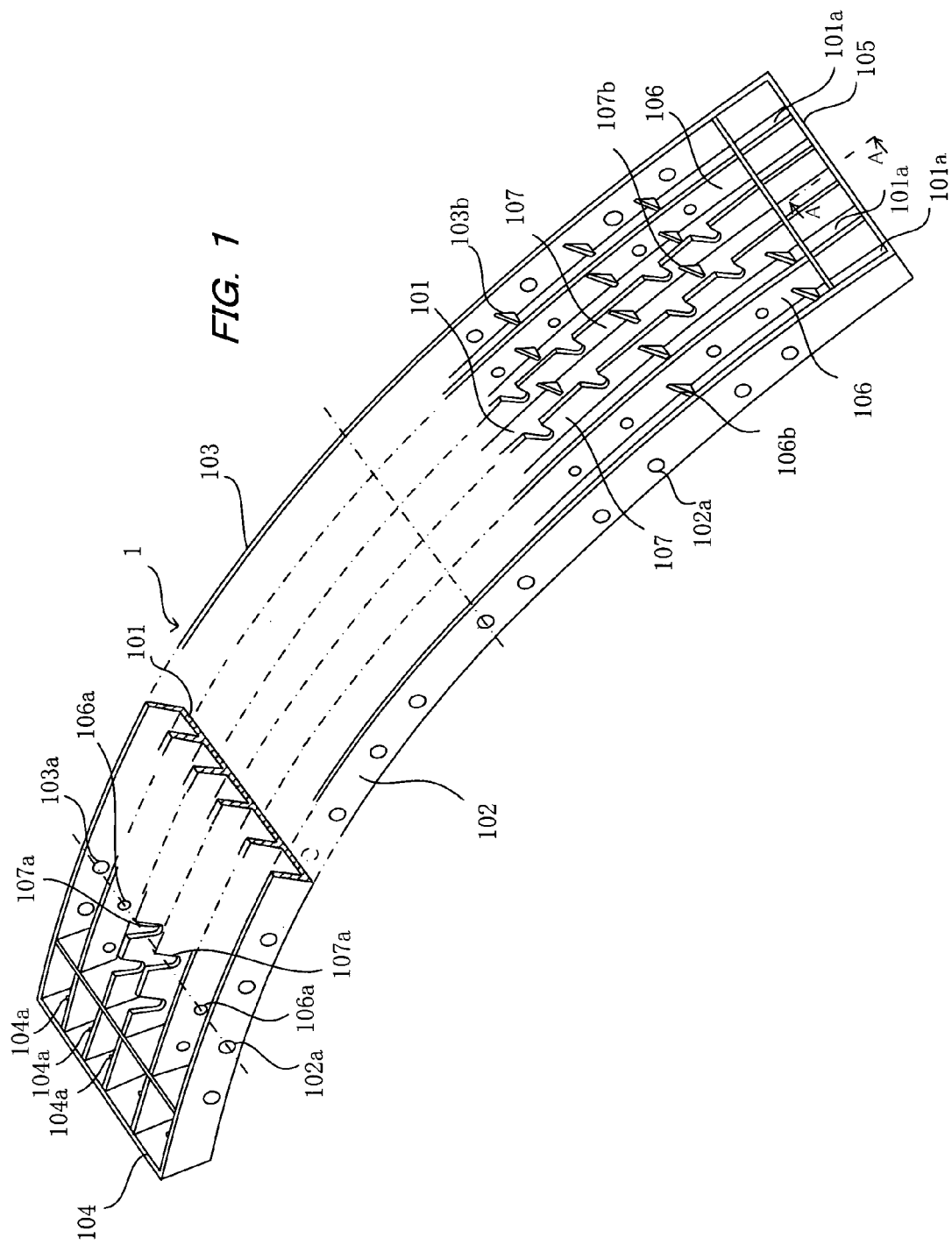
FIG. 1 is a perspective view showing the structure of a segment used to assemble a rehabilitating pipe.

FIG. 1 shows the structure of a rehabilitating pipe segment 1 (hereinafter referred to simply as a segment), which is used as an assembly unit of a rehabilitating pipe for rehabilitating an existing pipe. The segment 1 is an integrally molded block-shaped member made of a plastic material and composed of an internal surface plate 101 constituting the internal circumferential surface of the rehabilitating pipe, side plates 102, 103 erected vertically at both sides extending in the circumferential direction of the internal surface plate 101, and end plates 104, 105 erected vertically at both ends extending in the pipe length direction of the internal surface plate 101. The side plates 102, 103 and end plates 104, 105 are on four sides at the same height and constitute outer wall plates surrounding the peripheral edges of the internal surface plate 101. In the present embodiment, the segment 1 has a shape curved into an arc obtained by dividing the circumference into, e.g., five equal parts at predetermined angles (72°). The segment is not limited to an arc or fan shape, and can also be a rectangular parallelepiped, a curved shape made by providing roundness to right angles, or another shape in accordance with the cross-sectional shape of the existing pipe, the size thereof, or the maintenance locations of the existing pipe.

In cases of reinforcing the mechanical strength of the segment 1, a plurality of internal plates 106, 107 similar to the side plates 102, 103 are erected in parallel with the side plates on the top surface of the internal surface plate 101 inside of the side plates 102, 103. On the inside surfaces of the side plates 102, 103 and on both side surfaces of the internal plates 106, 107 are formed convex plates 103b, 106b, 107b projecting to the sides at a plurality of locations in order to prevent deformation. This creates a rib structure and increases the strength of the segment 1.

The internal surface plate 101, the side plates 102, 103, the end plates 104, 105, the internal plates 106, 107, and the convex plates are all made of the same transparent, semitransparent, or nontransparent plastic, and are integrally molded using a conventional molding technique.

A plurality of openings 101a for linking segments 1 in the circumferential direction are formed at both ends of the internal surface plate 101, and in order to link the segments 1 in the pipe length direction, a plurality of holes 102a, 103a, and 106a are formed in the side plates 102, 103 and internal plate 106, and a plurality of grooves 107a are formed in the internal plates 107.

Figure 2:
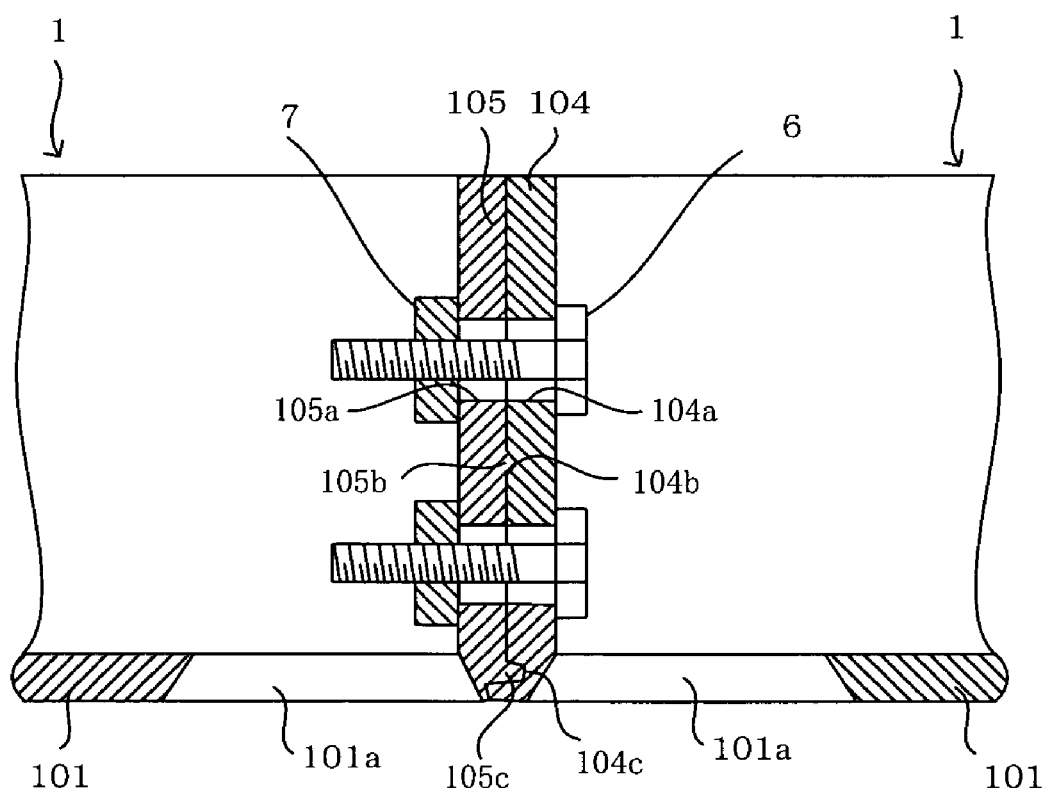
FIG. 2 is a cross-sectional view along the line A-A in FIG. 1, showing the structure of the segments linked together in the circumferential direction.

Bolts 6 are inserted into insertion holes 104a, 105a from the openings 101a of the segments 1, and nuts 7 are threaded over the bolts 6 in order to fasten the end plates 104, 105 together and link the segments 1 in the circumferential direction, as shown in FIG. 2. Concavities 104b, 104c are formed across the entire lengths of the end plates 104 in the pipe length direction, and convexities 105b, 105c which fit into the concavities are similarly formed in the end plates 105. Therefore, the operation of positioning and firmly connecting the segments 1 when linking them together is made easier. The watertightness of the linked portions can be increased by coating the fitted portions with a seal material (not shown). After the segments are finished being linked, the openings 101a are closed using lids (not shown) or other means. The internal surfaces of the lids at this time are continuous with the internal surfaces of each internal surface plate 101 so as to form an even internal surface. In cases in which it is easy to link the segments in the circumferential direction by the bolts 6 and nuts 7, there is no particular need for the openings 101a. Two sets of bolts and nuts are used in FIG. 2, but in the case of segments used for small-diameter existing pipes, the segments can be linked in the circumferential direction by only one set of a bolt and nut.

Figure 3:
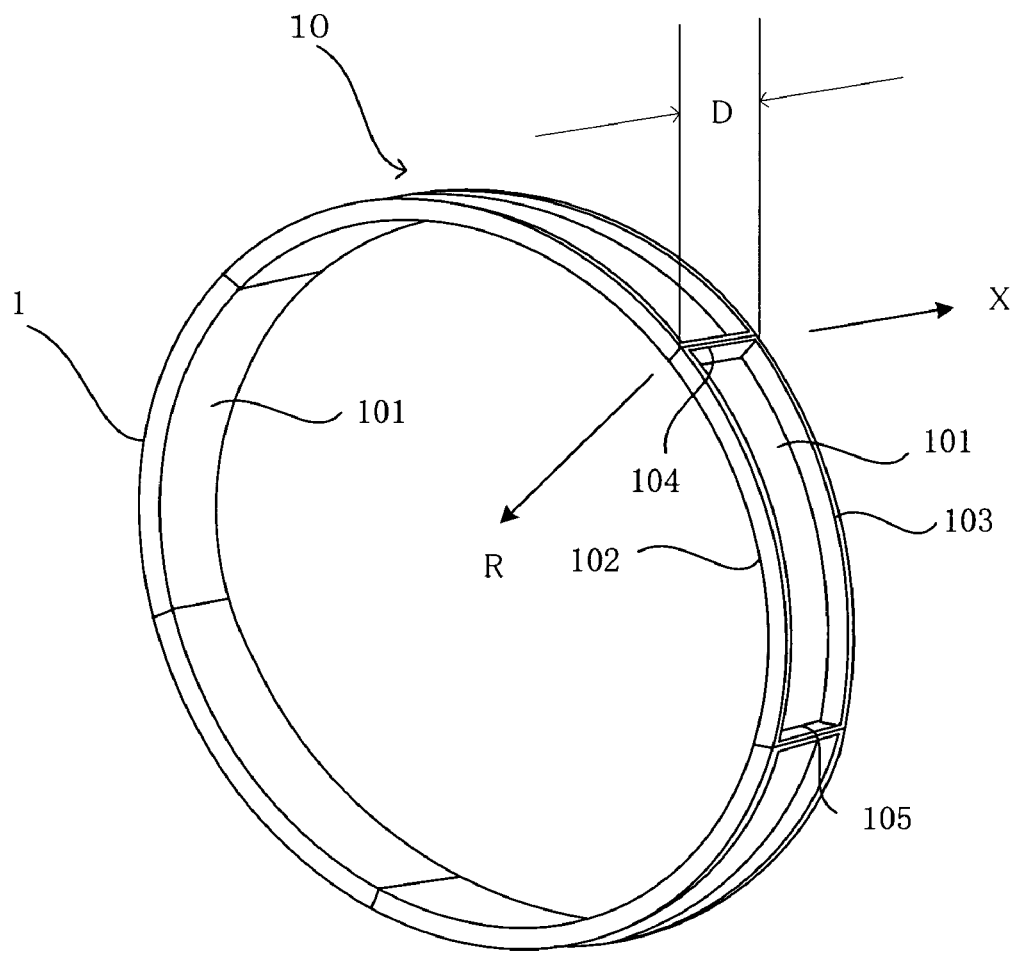
FIG. 3 is a perspective view showing a state in which segments have been linked together in the circumferential direction so as to assemble a pipe unit.

When segments 1 are linked sequentially in the circumferential direction to complete a full circle, a closed ring-shaped short pipe 10 (hereinafter referred to as a pipe unit) of a predetermined short length can be assembled, as shown in FIG. 3. The pipe unit 10 has a shape obtained when a circular pipe is cut into rings of a predetermined width D perpendicular to the pipe length direction X, and the outside diameter thereof is a value slightly less than the inside diameter of the existing pipe to be rehabilitated. The segments 1 correspond to members obtained when the pipe unit 10 is cut in the diametral direction R and divided (preferably equally divided) into a plurality of units in the circumferential direction.

The internal surface plates 101, side plates 102, 103, and end plates 104, 105 are shown in FIG. 3 as primary structural members of the segments 1, and the internal plates 106, 107, convex plates, and other reinforcing structures are not shown for the sake of avoiding complexity. In this Specification, the term "pipe length direction" refers to the direction indicated by the arrow X extending in the pipe length direction of the pipe unit 10 in FIG. 3, the term "diametral direction" refers to the radial direction indicated by the arrow R pointing toward the center axis of the pipe unit 10, and the term "circumferential direction" refers to the circumferential direction of the circle formed by the pipe unit 10.

Figure 14:
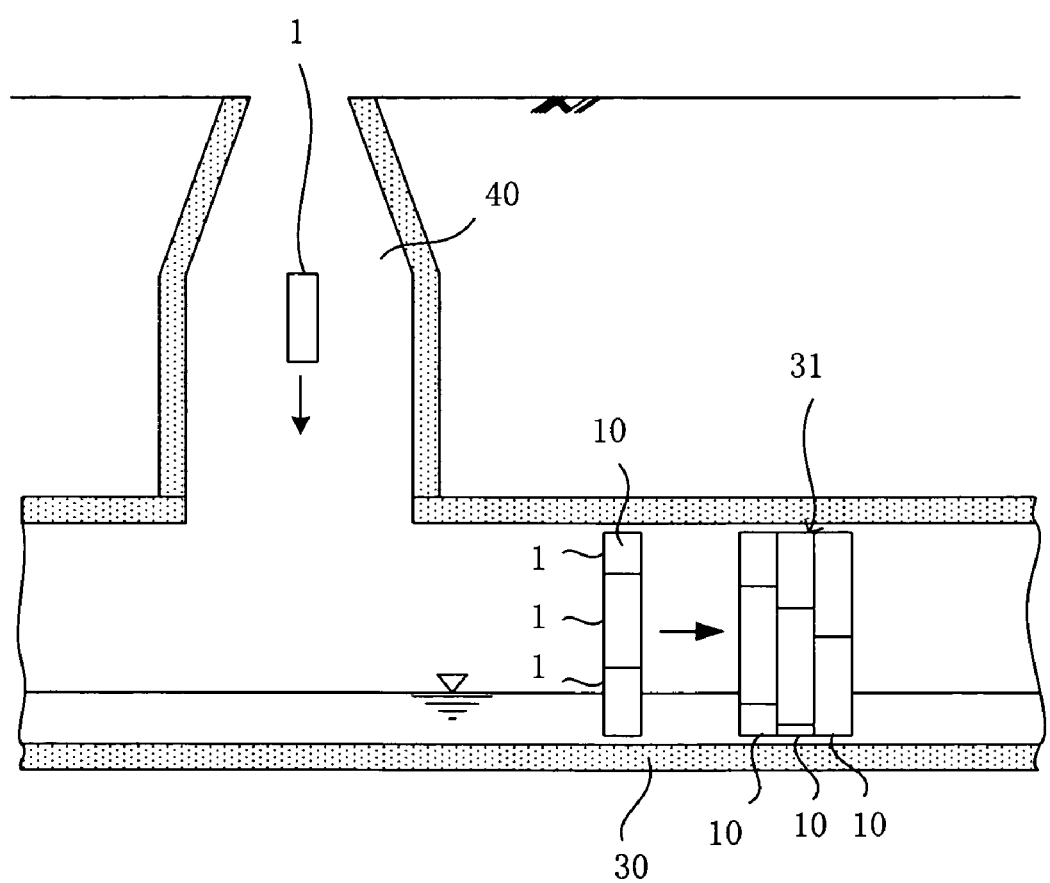
FIG. 14 is an illustrative view showing a state in which a rehabilitating pipe composed of the segments is laid in an existing pipeline.

In the work of rehabilitating the existing pipe, a plurality of segments 1 are transported into a manhole 40 to assemble the pipe unit 10, and the segments of the pipe unit 10 are linked in the pipe length direction so as to assemble a rehabilitating pipe 31 inside an existing pipe 30, as shown in FIG. 14.

Figure 4:
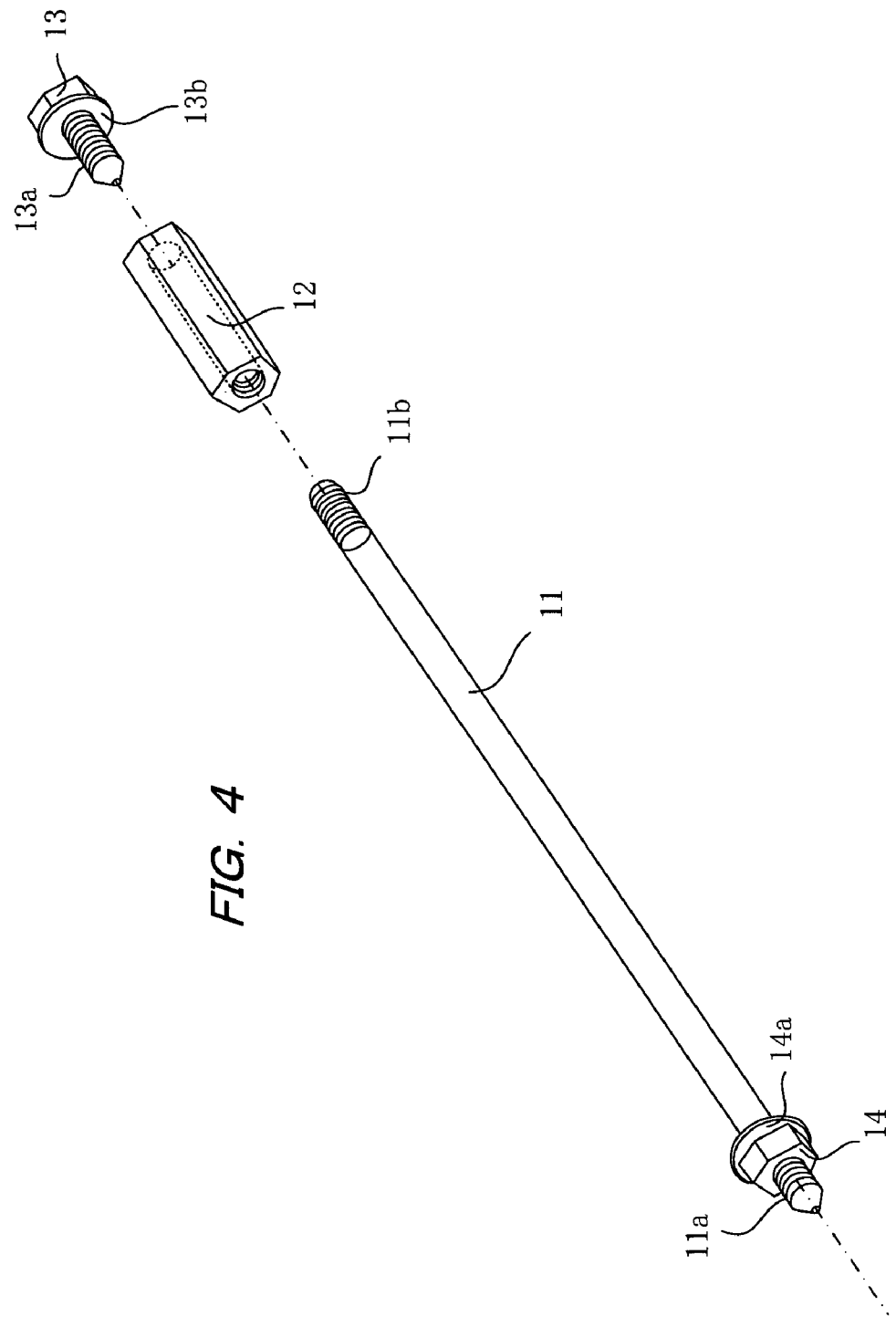
FIG. 4 is a perspective view showing one embodiment of a fastening member for linking the segments in the pipe length direction.

FIG. 4 shows a fastening member (linking member) 11 for linking segments in the pipe length direction. The fastening member 11 is a rod-shaped screw member having screws 11a, 11b formed at both ends. A nut 14 with a flange 14a is threaded over the screw 11a of the fastening member 11. The screw 11b of the fastening member 11 is screwed into one end of a nut 12, and a flanged bolt 13 having a screw 13a is threaded into the other end thereof. The nut 12 is shaped so as to be capable of passing through the same-diameter holes 102a, 103a in the side plates 102, 103 of the segment 1, but not through the hole 106a in the internal plate 106. The flange 14a of the nut 14 is sized so as to be capable of passing through the hole 102a in the side plate 102 of the segment 1, but not through the hole 106a in the internal plates 106. The flange 13b of the bolt 13 has a larger diameter than the hole 106a in the internal plate 106, and the diameter of the fastening member 11 is smaller than the diameter of the hole 106a in the internal plate 106. The fastening member 11, the nuts 12, 14 and the bolt 13 are all made of metal.

Figure 5:
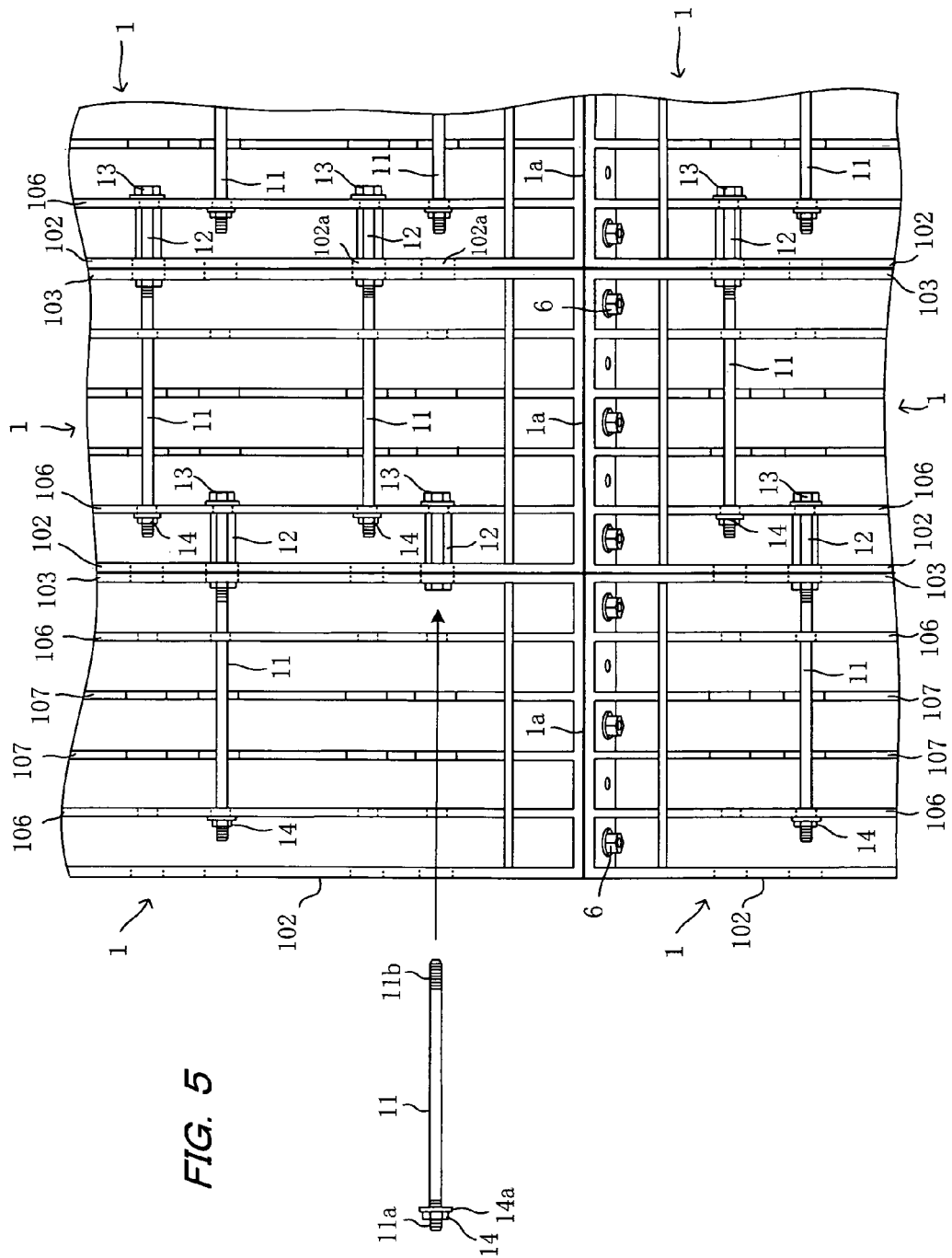
FIG. 5 is a top view showing a state in which segments have been linked in the pipe length direction using the fastening member shown in FIG. 4.
Figure 6:
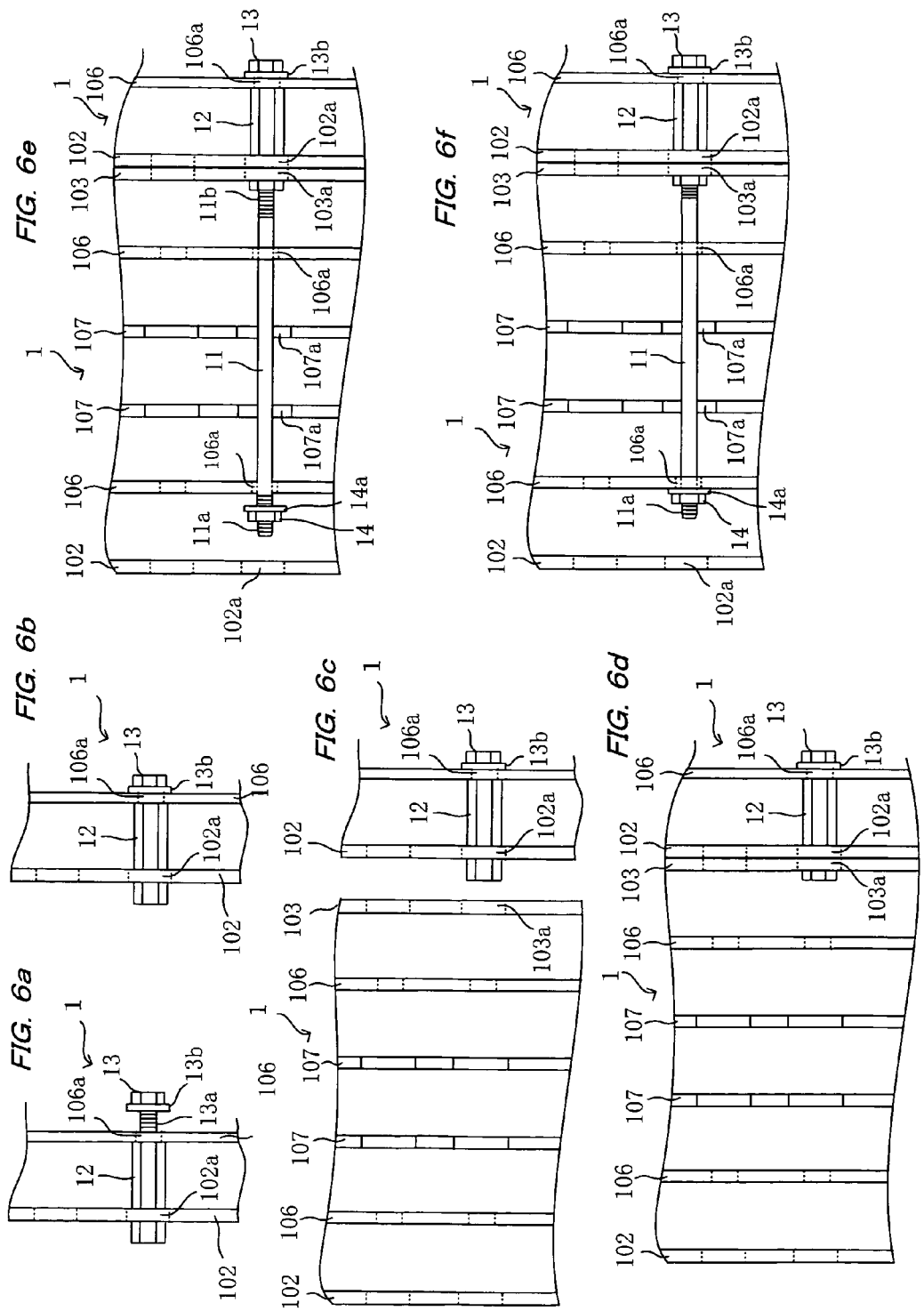
FIGS. 6a through 6f are top views showing a method for linking segments together in the pipe length direction.

FIGS. 5 and 6 show how the segments are linked in the pipe length direction using the fastening member 11 and the nut 12.

The nut 12 is passed through the hole 102a in the side plate 102 of one segment 1 and brought into contact with the internal plate 106, and the bolt 13 is screwed into the nut 12 as shown in FIG. 6a. The nut 12 is then fastened to the internal plate 106 so as to be secured to the segment 1 as shown in FIG. 6b. The nut 12 may be secured to the segment 1 after the segments are linked in the circumferential direction as shown in FIG. 3, or the segments may be linked in the circumferential direction so as to constitute the pipe unit 10 after the nut 12 is first secured to the segment 1.

The nut 12 protrudes from the side plate 102, as shown in FIG. 6b, and its protruding distance is equal to or greater than the thickness of the side plate 103 of another segment. The nut 12 is passed through the hole 103a in the side plate 103 of another segment 1 as shown in FIGS. 6c and 6d in order to bring the two segments 1 together. In this sate, the nut 12 protrudes from the side plate 102 and can be passed through the hole 103a of another segment. This makes easy the positioning of both the segments when they are linked in the pipe length direction.

The fastening member 11 is then passed through the hole 102a in the side plate 102 of the segment 1, the holes 106a in the internal plates 106, and the grooves 107a in the internal plates 107 as shown in FIGS. 5 and 6e, and the screw 11b is screwed into the nut 12 that is secured to one segment 1. The fastening member 11 and the nut 12 are thereby linked together. The nut 14 is then rotated until the flange 14a of the nut 14 is pressed against the internal plate 106 as shown in FIG. 6f. This enables the two segments 1, 1 to be fastened together and secured in place.

A plurality of the nuts 12 are secured to a single segment in the circumferential direction, e.g., are secured every other hole 102a of the side plate 102, or are secured every plurality of holes in accordance with the required strength. Each segment is connected so that the nut position in a first segment is offset as viewed in the circumferential direction from the nut position of a second segment that is adjacent to the first segment. In the example as shown in FIG. 5, the position of the nut 12 in the center-positioned segment 1 is, as viewed in the circumferential direction, offset by a single hole 102a of the side plate 102 from the position of the nut 12 in the segment 1 adjacent to the right side plate of the center-positioned segment. By having the positions of the nuts differ in an adjacent segment in this manner, the arrangement of the fastening members and the nuts becomes staggered as viewed in its entirety. This allows the coupling strength of the segments in the pipe length direction to be made more uniform than in the case in which the nuts are not offset.

The internal plate with which the flanged nut 14 of the fastening member 11 makes pressing contact is the internal plate 106 positioned nearest to the left side plate 102; that is the internal plate 106 farthest from the nut 12 into which the fastening member 11 is screwed. Therefore, the length of the fastening member 11 in the pipe length direction can be extended, and the coupling strength of the segments in the pipe length direction can be increased. However, the length of the fastening member 11 in the pipe length direction does not extend beyond the internal plate 106 to which the nut 12 is secured. This prevents the fastening member 11 from being made longer than necessary, thereby simplifying and shortening the work for linking the segments in the pipe length direction.

In FIG. 5, the linking of segments in the circumferential direction is accomplished via one set of bolts and nuts, and one bolt 6 is shown in FIG. 5.

Figure 7:
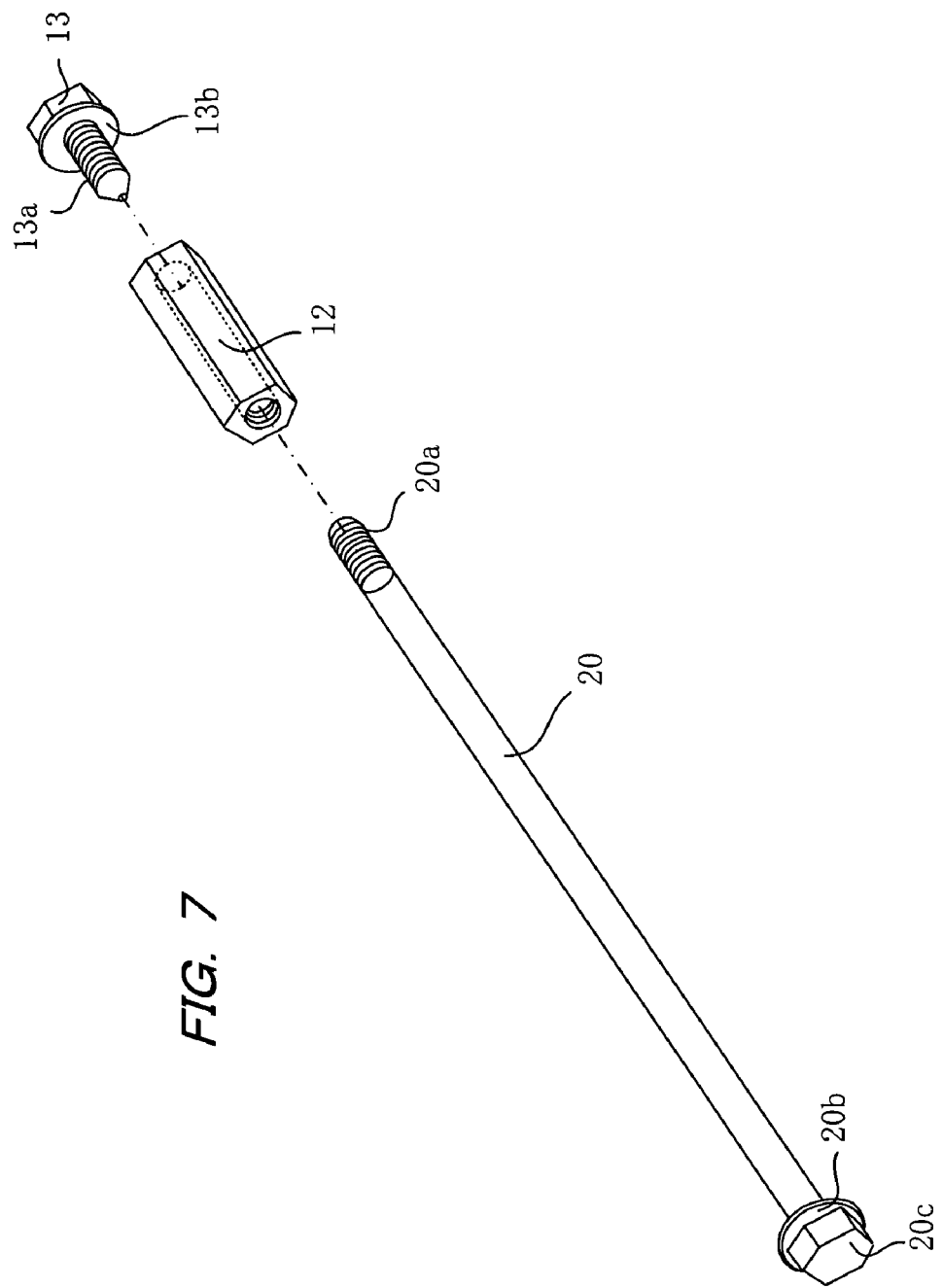
FIG. 7 is a perspective view showing another embodiment of the fastening member for linking the segments in the pipe length direction.

As shown in FIG. 7, the fastening member may be composed of a long bolt 20 that has at one end a screw part 20a screwed into the nut 12, and at the other end a hexagonal part 20c with a flange 20b. The diameter of the long bolt 20 is the same as that of the fastening member 11, and the flange 20b is circular having the same diameter as the flange 14a of the nut 14. The long bolt 20 is the same as the fastening member 11 in terms of function.

Figure 8:
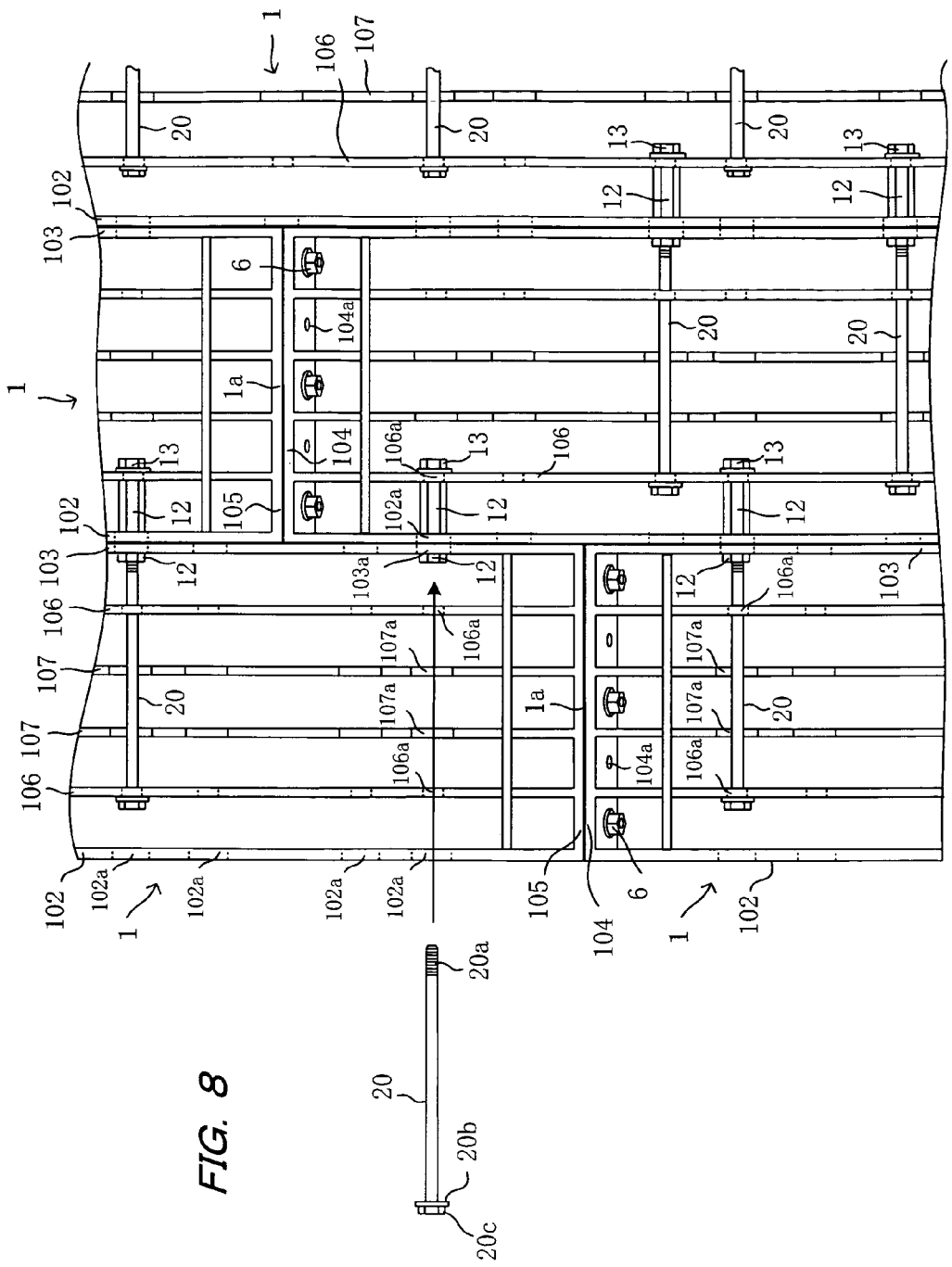
FIG. 8 is a top view showing a state in which segments have been linked in the pipe length direction using the fastening member shown in FIG. 7.

Using the long bolt 20, the linking of the segments can be carried out in the same manner as when the fastening member 11 is used. As shown in FIG. 8, the long bolt 20 is screwed into the nut 12 until the flange 20b makes pressing contact with the internal plate 106 and the two segments 1, 1 are fastened and secured together.

In FIG. 8, the segments 1 are linked so that a linking part 1a at which the segments 1 are linked in the circumferential direction is offset by a predetermined distance in the circumferential direction from the linking part 1a of the segments adjacent in the pipe length direction. Such an arrangement allows the linking part 1a to be sandwiched by the side plates of two segments, thereby increasing the linking strength of the rehabilitating pipe. It is naturally possible to use the fastening member 11 as shown in FIG. 4 also when the segments are linked as shown in FIG. 8.

Figure 9A:
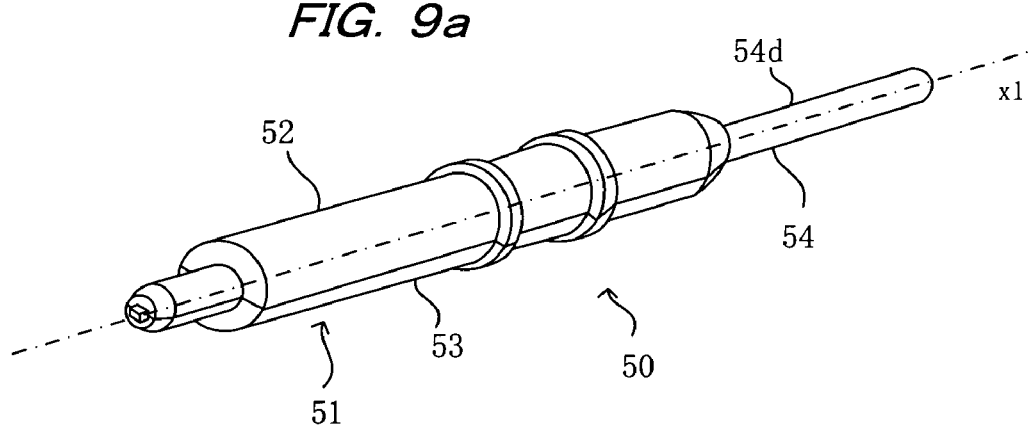
FIG. 9a is a perspective view showing a linking tool.
Figure 9B:
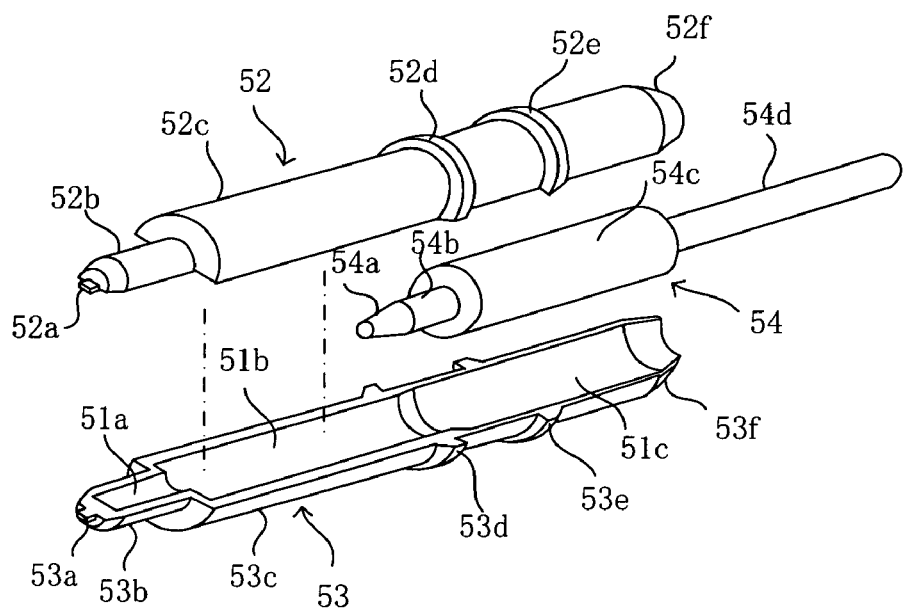
FIG. 9b is a perspective view showing the linking tool, as viewed when it is disassembled.

In order to link the segments 1 or the pipe units 10 in the pipe length direction, a linking tool 50 as shown in FIGS. 9a and 9b may be additionally used. The linking tool 50 comprises a tubular hollow linking pin 51 made of plastic and constructed from overlaying linking pin halves 52, 53, and a plastic separating pin 54 that separates the linking pin 51 into the linking pin halves 52, 53.

As shown in FIGS. 9a, 9b, the linking pin half 52 has a thin part 52a at the distal end; a half-pipe part 52c having a shape obtained when the portion of a circular tube above a pipe axis x1 is cut off in the horizontal direction; a projecting part 52b that has a half-pipe shape having a small diameter and that projects farther toward the distal end than the half-pipe part 52c; a first protruding part 52d and a second protruding part 52e that extend in the circumferential direction over the outer circumferential surface of the half-pipe part 52c; and a slanted part 52f. The mutually facing surfaces of the first and second protruding parts 52d and 52e are vertical, while the opposite portions thereof are slanted and are continuous with the half-pipe part 52c.

The linking pin half 53 is shaped to be vertically symmetric with the linking pin half 52. The linking pin half 53 has a thin part 53a at distal end, a projecting part 53b, a half-pipe part 53c, a first protruding part 53d, a second protruding part 53e, and a slanted part 53f.

Figure 10:
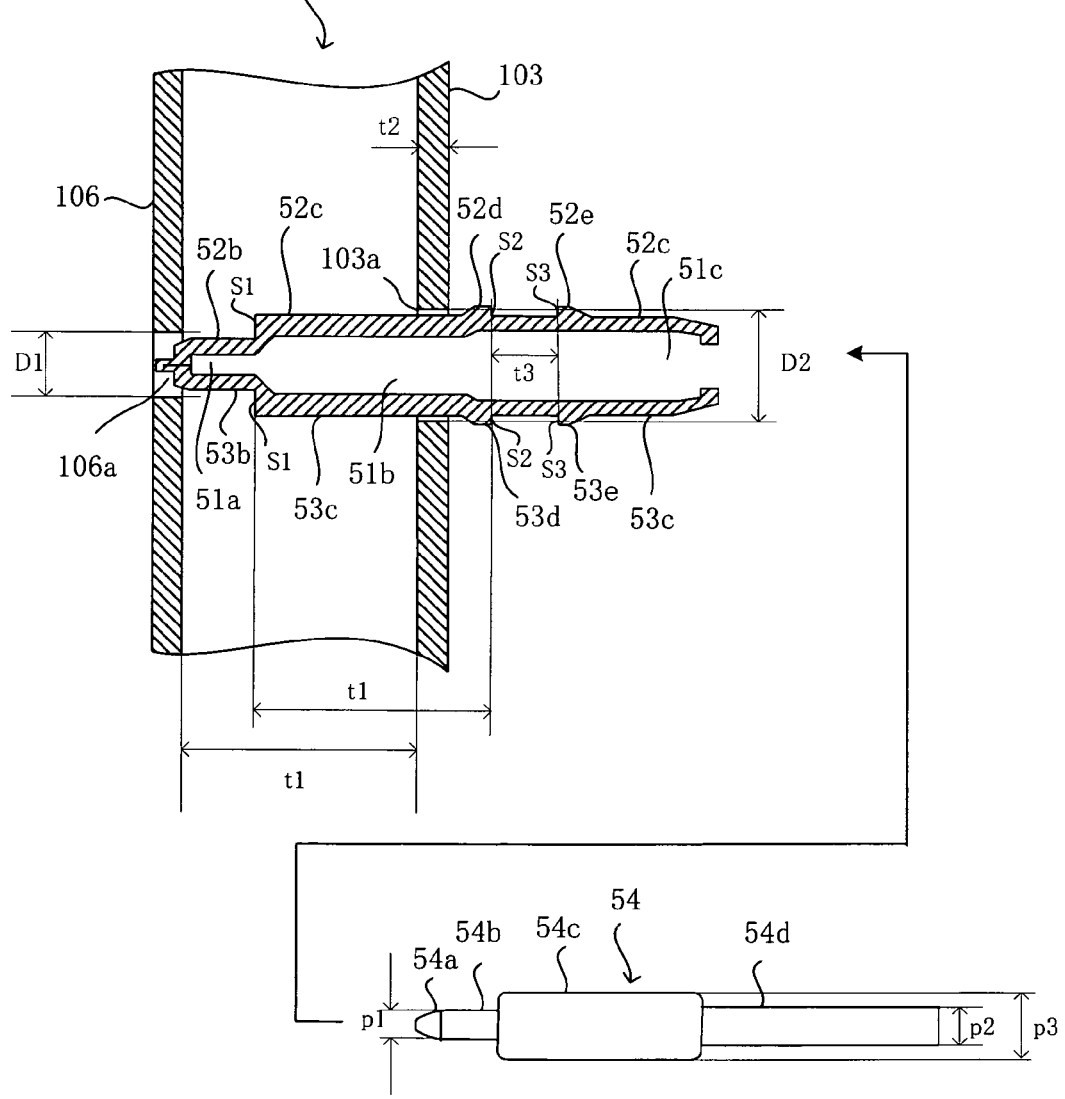
FIG. 10 is a cross-sectional view showing the dimensions of a linking pin, a separating pin, the side plate of the segment, and the internal plate thereof.

As shown in FIG. 10, when the linking pin halves 52, 53 are overlaid, a hollow part 51a having a small diameter and a hollow part 51b having a larger diameter are formed on the inside of the linking pin 51. The thickness of the linking pin halves 52, 53 decreases beyond the first protruding parts 52d, 53d toward the end (the right side) of the linking pin. A hollow part 51c having a larger diameter than the hollow part 51b is therefore formed.

The separating pin 54 is a cylindrical pin of plastic or metal and has a conical distal part 54a, a cylindrical distal part 54b, a cylindrical center part 54c, and a cylindrical proximal part 54d.

The dimensions of the segment 1, the separating pin 54, and the linking pin 51 obtained when the linking pin halves 52, 53 are overlaid are shown in FIG. 10.

A diameter D2 of the circular hole 103a formed in the side plate 103 of the segment 1 is larger than a diameter D1 of the circular hole 106a of the internal plate 106 adjoining the side plate 103. The size of the linking pin 51 allows the projecting parts 52b, 53b of the linking pin to pass through the hole 106a of the internal plate 106 with a predetermined spacing, and allows the half-pipe parts 52c, 53c to pass through the hole 103a of the side plate 103 with a substantially identical spacing. The first protruding parts 52d, 53d of the linking pin 51 are slanted on the inserting side (the left side) and protrude outwardly so high as to be able to pass through the hole 103a due to its elasticity if forcefully pressed. The second protruding parts 52e, 53e of the linking pin 51 are also of an identical size and have lateral symmetry with the first protruding parts 52d, 53d.

A distance t1 from a boundary surface S1 between the projecting parts 52b, 53b and the half-pipe parts 52c, 53c of the linking pin 51 to a vertical surface S2 of the first protruding parts 52d, 53d is approximately equal to the distance between the opposing surfaces of the side plate 103 and the internal plate 106 of the segment 1. A distance t3 between opposing vertical surfaces S2, S3 of the first protruding parts 52d, 53d and the second protruding parts 52e, 53e is approximately double a thickness t2 of the side plate 103 (or the side plate 102) of the segment 1 in the pipe length direction.

The outside diameters of the distal part 54b, the center part 54c, and the proximal part 54d of the separating pin 54 are p1, p3, and p2, respectively, where p3>p2>p1.

When the linking pin halves 52, 53 are in an overlaid state, the size of the center part 54c of the separating pin 54 allows the center part to be housed in the hollow part 51c of the linking pin 51 but does not allow insertion into the hollow part 51b. The size of the distal part 54b of the separating pin 54 also prevents insertion into the hollow part 51a of the linking pin 51. However, when pressure is applied and the separating pin 54 is pushed in, the center part 54c of the separating pin 54 is pressed into the hollow part 51b of the linking pin 51, and the distal part 54b thereof is pressed into the hollow part 51a of the linking pin 51. This allows the linking pin 51 to be pushed apart and separated into the linking pin halves 52, 53. The separated linking pin halves 52, 53 are pressed against the holes 103a, 106a of the side plate 103 and the internal plate 106 of the segment 1 by the separating pin 54.

A method for linking segments in the pipe length direction using the linking tool configured in this manner will be described next.

With the linking pin halves 52, 53 overlaid and the separating pin 54 housed inside the linking pin 51, the linking pin 51 is inserted into the hole 103a in the side plate 103 of the segment 1.

Figure 11A:
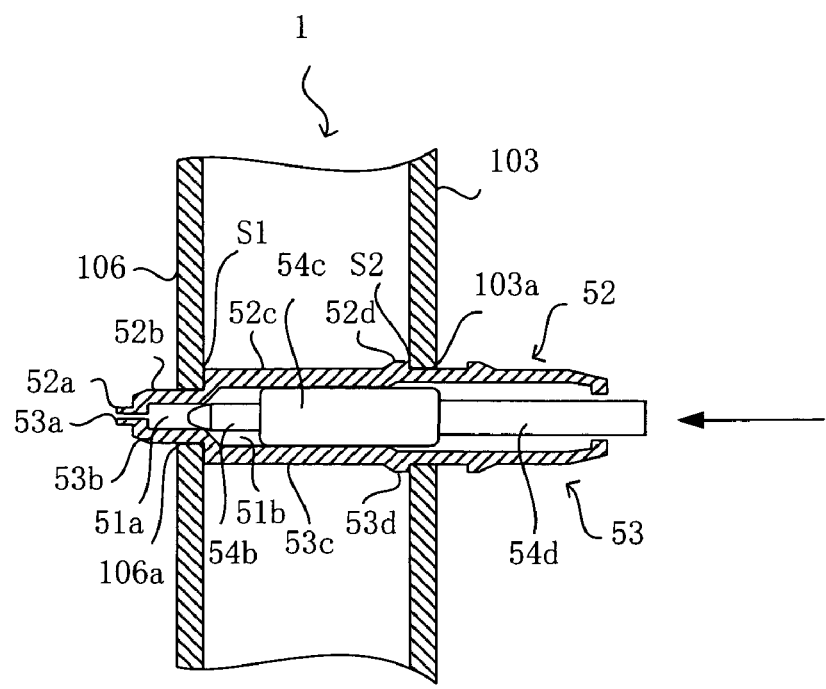
FIG. 11a is a cross-sectional view showing a state in which the separating pin is pressed in to separate the linking pin into the linking pin halves.
Figure 11B:
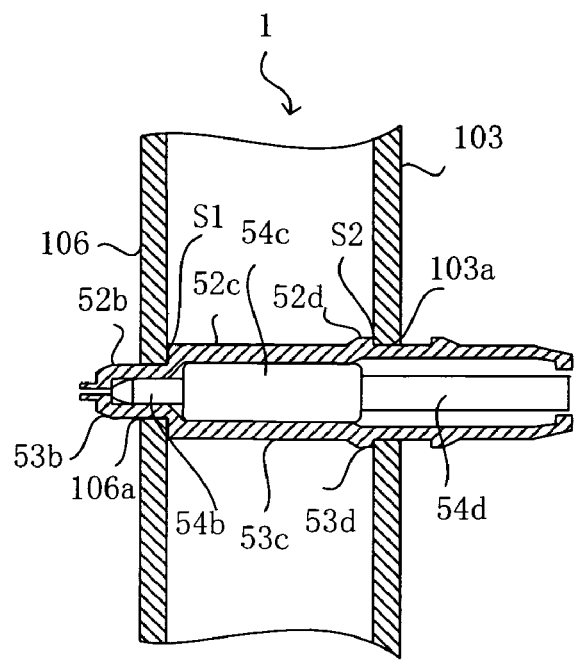

The half-pipe parts 52c, 53c of the linking pin 51 can pass through the hole 103a of the side plate 103 of the segment 1, and the projecting parts 52b, 53b can also pass through the hole 106a of the internal plate 106. The linking pin 51 is therefore inserted into the holes 103a, 106a with a predetermined spacing. The insertion sides (the left side) of the first protruding parts 52d, 53d of the linking pin 51 are slanted, and therefore, if the separating pin 54 is forcefully pushed in as indicated by an arrow in FIG. 11a, the first protruding parts 52d, 53d will pass through the hole 103a due to the elasticity of the linking pin 51. Pushing the separating pin 54 further causes the distal part 54b and the center part 54c of the separating pin 54 to be pushed into the hollow part 51a and the hollow part 51b of the linking pin 51, respectively, and the linking pin 51 to be separated into the linking pin halves 52, 53, as shown in FIGS. 11a and 11b. The separated linking pin halves 52, 53 are pressed against the holes 103a, 106a of the side plate 103 and the internal plate 106 by the separating pin 54. The distance t1 from the boundary surface S1 to the vertical surface S2 of the first protruding parts 52d, 53d is equal to the distance between the opposing surfaces of the side plate 103 and the internal plate 106. The boundary surface S1 therefore contacts the inside surface of the internal plate 106, and the vertical surface S2 contacts the inside surface of the side plate 103. The linking pin 51 is thus fixed to the segment 1 by forcefully pushing the separating pin 54 in.

Figure 11C:
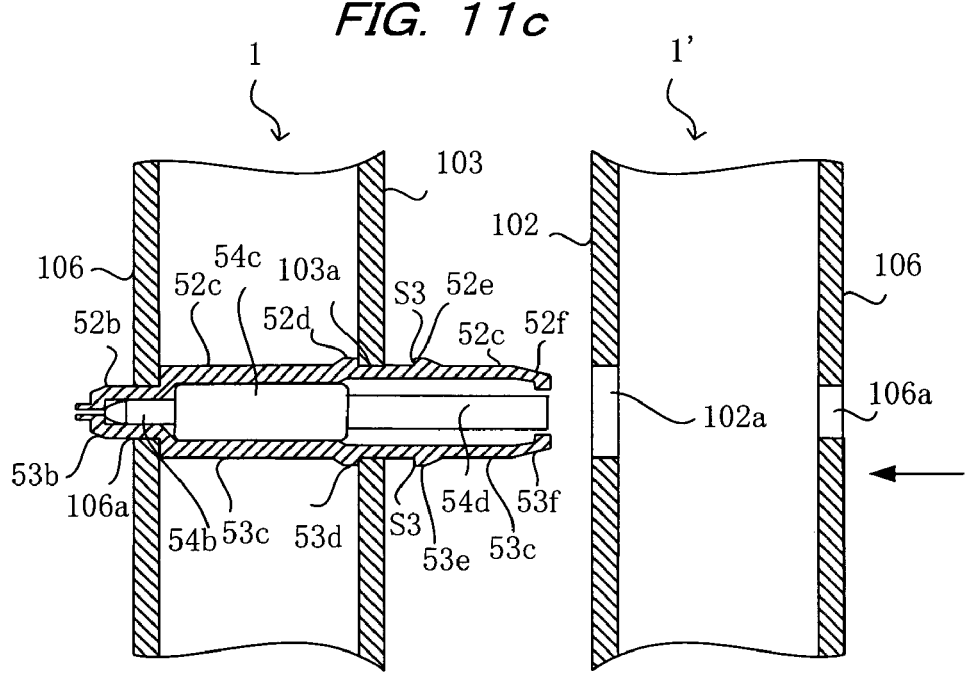
FIG. 11c is a cross-sectional view showing a state in which the linking pin is pushed into the hole of the side plate of another segment.
Figure 11D:
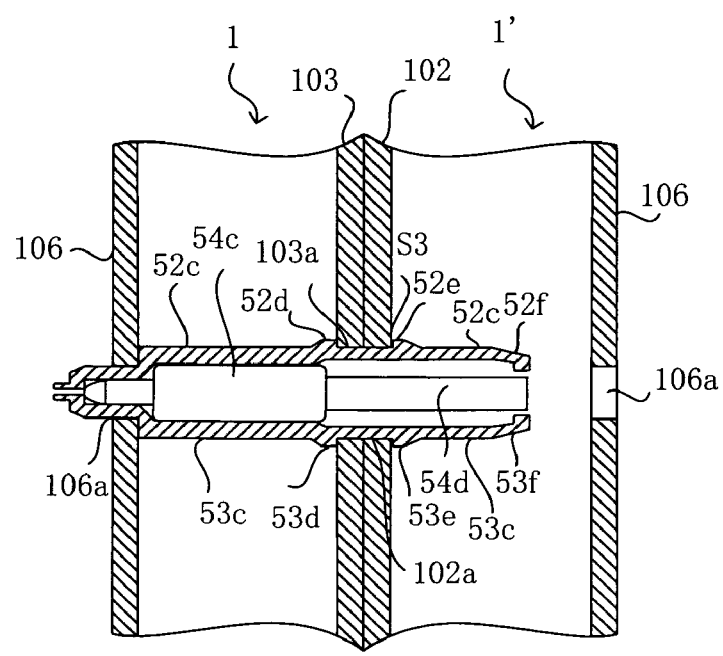
FIG. 11d is a cross-sectional view showing a state in which two segments have been linked by the linking pin.

Next, as shown in FIGS. 11c and 11d, the end opposite the inserted end of the linking pin 51, which has been separated into the linking pin halves 52, 53, is inserted into the hole 102a of the side plate 102 of another segment 1'. The side plate 102 slides over the slanted surfaces of the second protruding parts 52e, 53e, and the side plate 102 of the segment 1' and the linking pin 51 are snapped together and fixed to each other. The segment 1' is thus fixed to the segment 1 by the linking pin 51, and therefore the segments 1 and 1' can be firmly linked in the pipe length direction.

Figure 12:
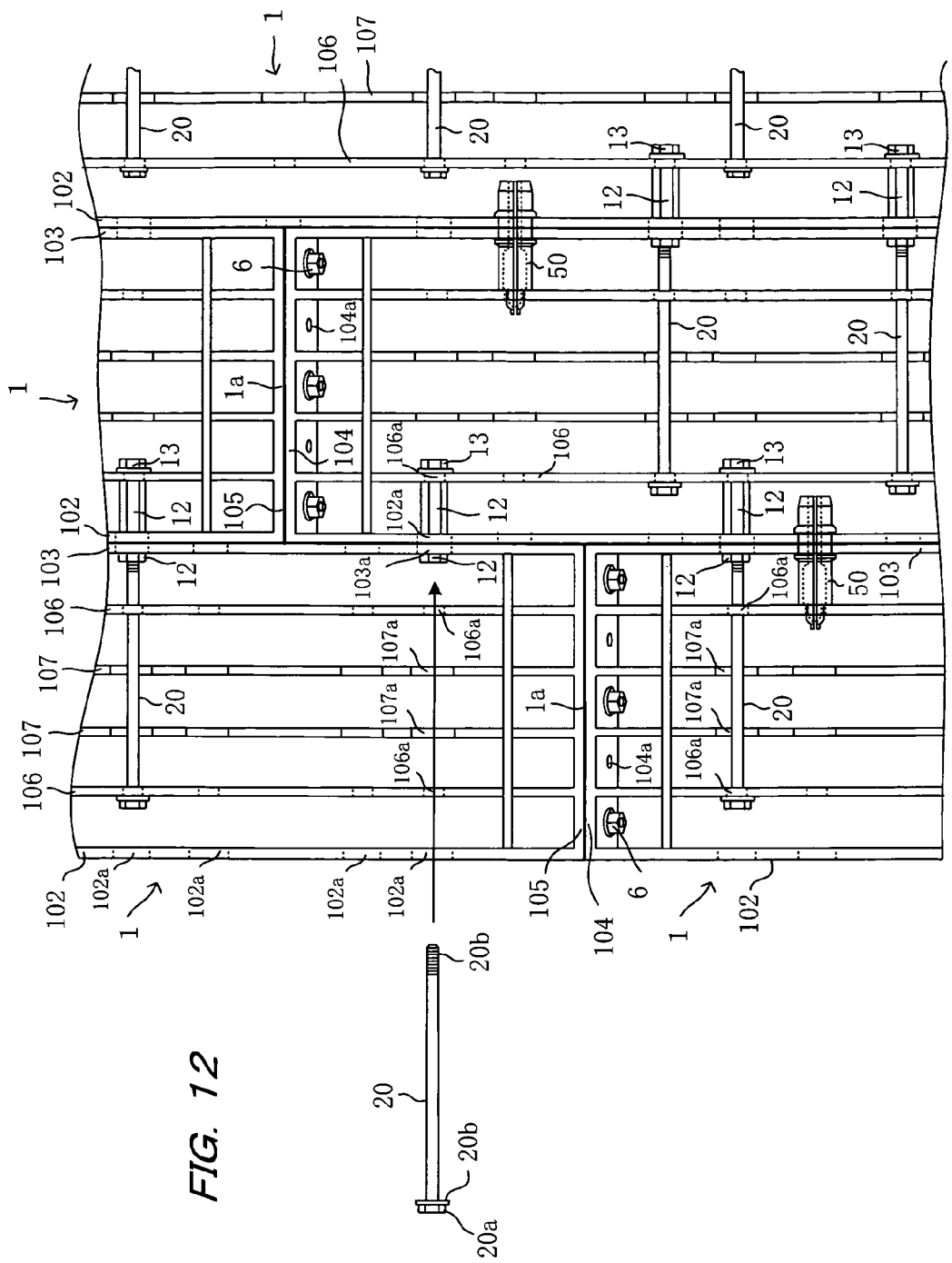
FIG. 12 is a top view showing a state in which segments have been linked in the pipe length direction using the fastening members and the linking tools.

The segments can be linked in the pipe length direction using the linking tool 50 in combination with connections using the fastening member 11 (or long bolt 20) and the nut 12, as shown in FIG. 12. First, the nut 12 is secured to the segment (e.g., in three or four locations per segment), and two segments are connected in the pipe length direction using several linking tools 50 (e.g., two or three linking tools). By snap-fitting connections using the linking tool 50, the segments can be linked in a short period of time in the pipe length direction. The fastening member 11 (long bolt 20) is thereafter screwed into the nut 12 to fasten the two segments more firmly. In this case, the connection using the fastening member 11 (long bolt 20) and the nut 12 is simplified because the segments are linked first using the linking tool 50. The segments can thus be firmly linked in the pipe length direction in a short period of time by using different connection schemes. The number of fastening members 11 (long bolts 20) and linking tools used per segment is determined in accordance with the required strength of the rehabilitation pipe.

Figure 13:
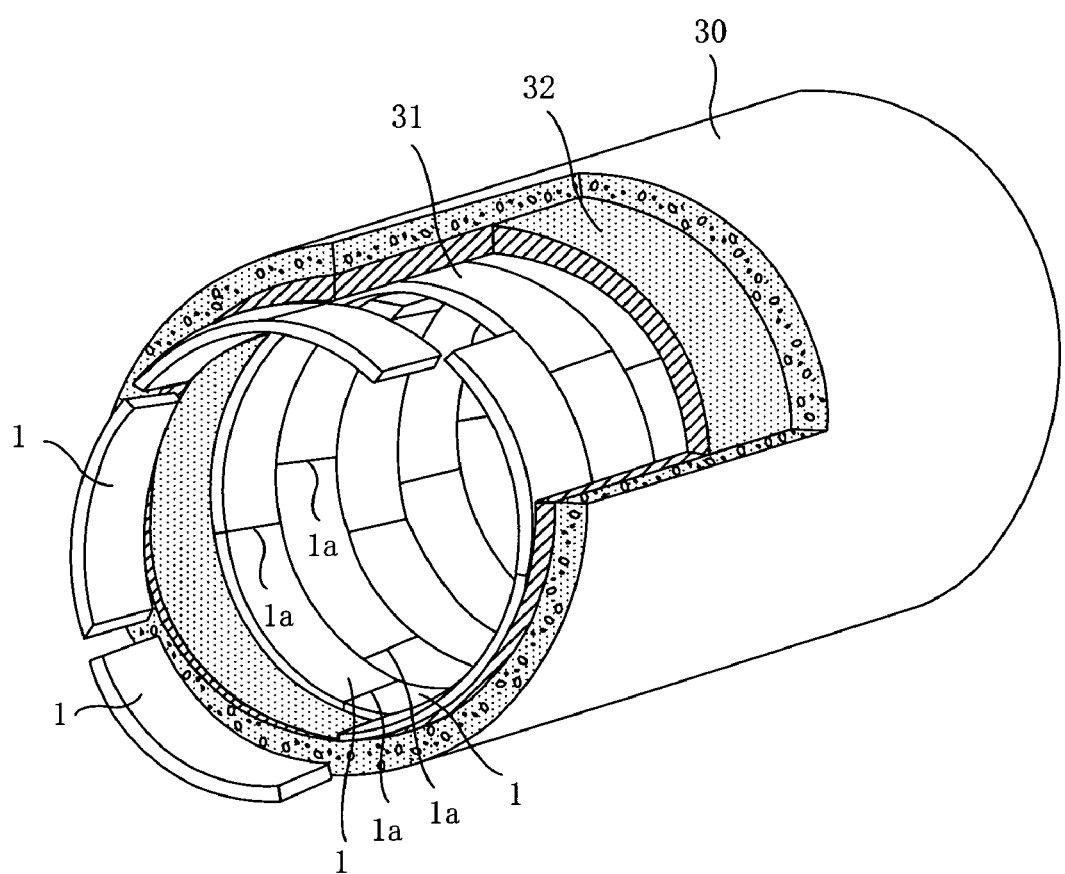
FIG. 13 is a perspective view showing a state in which a rehabilitating pipe is assembled inside an existing pipe using the segments.

As described above, the pipe units or segments are sequentially linked in the pipe length direction to assemble the rehabilitating pipe 31 inside the existing pipe 30, as shown in FIGS. 13 and 14. A grouting material 32 or other filler is poured into a gap between the existing pipe 30 and the rehabilitating pipe 31 to make both the pipes 30 and 31 integrated and construct a composite pipe.

In FIG. 13, the structure of the segments and the linking thereof in the circumferential and pipe length directions have been omitted in order to avoid complexity. In FIG. 13, the linking portions 1a at which the segments 1 are linked in the circumferential direction are also a predetermined length offset from the linking portions 1a of the segments that are adjoining in the pipe length direction, as shown in FIG. 8.

What is claimed is:

1. An existing pipe rehabilitation method for rehabilitating an existing pipe by linking segments in the circumferential and pipe length directions to assemble a rehabilitating pipe inside the existing pipe, comprising:
    securing a plurality of nuts to the segments along the circumferential direction thereof;
    preparing a fastening member that can be screwed into the nut; and
    screwing the fastening member into the nut to fasten a first segment to a second segment to which the nut is secured, thereby linking the first and second segments in the pipe length direction thereof;
    wherein each of the segments is linked so that the nut position in the first segment is offset as viewed in the circumferential direction from the nut position of the second segment.

2. An existing pipe rehabilitation method according to claim 1, wherein the segment includes an internal surface plate that constitutes the internal circumferential surface of the rehabilitating pipe, side plates that are erected vertically at both sides extending in the circumferential direction of the internal surface plate, and internal plates that are erected in parallel with the side plates on the top surface of the internal surface plate, the fastening member being screwed from the internal plate of the first segment into the nut secured to the second segment, thereby bringing the other end of the fastening member on the side opposite to the nut into pressing contact with the internal plate so as to fasten the first and second segments in the pipe length direction.

3. An existing pipe rehabilitation method according to claim 2, wherein a plurality of internal plates are provided and the internal plate with which the fastening member makes pressing contact is the internal plate furthest from the nut into which the fastening member is screwed.

4. An existing pipe rehabilitation method according to claim 2, wherein a plurality of the internal plates are provided and the nut is secured to the internal plate in a position nearest to the side plate of the second segment.

5. An existing pipe rehabilitation method according to claim 4, wherein the nut extends in the pipe length direction so long as to protrude to the exterior of the side plate of the second segment in a state in which the nut is secured to the internal plate thereof, and the protruding distance is equal to or greater than the thickness of the side plate of the first segment to which the second segment is linked.

6. An existing pipe rehabilitation method according to claim 1, wherein the fastening member is a screw member having at one end a screw part that is screwed into the nut secured to the segment, and at the other end a screw part on which another nut is mounted.

7. An existing pipe rehabilitation method according to claim 1, wherein the fastening member is a bolt.

8. An existing pipe rehabilitation method according to claim 1, wherein the segments are linked in the pipe length direction in combination with connections in which a snap-fitting linking tool is used.

* * * * *